United States Patent
Siedlik et al.

[11] Patent Number: 5,902,695
[45] Date of Patent: May 11, 1999

[54] BATTERY TERMINAL SHIELD WITH IMPROVED HINGE

[75] Inventors: Henry Anthony Siedlik, Novi; Zenon Hotra, Troy; Michael Jerome Gniewek, Livonia, all of Mich.

[73] Assignee: UT Automotive Dearborn, Inc., Dearborn, Mich.

[21] Appl. No.: 08/796,468

[22] Filed: Feb. 10, 1997

[51] Int. Cl.[6] .................................................. H01M 2/34
[52] U.S. Cl. ............................ 429/65; 439/522; 429/181
[58] Field of Search ..................... 429/65, 181; 439/522, 439/521

[56] References Cited

U.S. PATENT DOCUMENTS

| | | |
|---|---|---|
| 2,671,819 | 3/1954 | Field .......................................... 429/65 |
| 3,633,154 | 1/1972 | Glantz . |
| 4,698,459 | 10/1987 | Drake . |
| 5,269,709 | 12/1993 | Eriksson . |
| 5,399,103 | 3/1995 | Kuboshima et al. . |
| 5,439,759 | 8/1995 | Lippert et al. . |
| 5,576,516 | 11/1996 | Kameyama et al. . |
| 5,804,770 | 9/1998 | Tanaka .................................. 429/65 X |

FOREIGN PATENT DOCUMENTS 1558223  12/1979  United Kingdom .

*Primary Examiner*—John S. Maples
*Attorney, Agent, or Firm*—Howard & Howard

[57] ABSTRACT

A battery terminal shield comprises a base including a lower wall having an orifice for receiving a battery terminal and a cover including an upper wall and a peripheral wall extending downwardly from the periphery of the upper wall. Preferably, the cover includes an integral generally cylindrical hinge pin having opposite axial ends. The base preferably includes a pair of hinge sockets into which the hinge in snap fits to hingedly connect the cover to the base. Each of the hinge sockets comprises a locking finger flexing axially outwardly of the hinge pin upon insertion of the hinge pin.

13 Claims, 2 Drawing Sheets

BATTERY TERMINAL SHIELD WITH IMPROVED HINGE

BACKGROUND OF THE INVENTION

This invention relates to a two-piece battery terminal shield having an improved hinge. Batteries on many current vehicles are provided with battery terminal shields which enclose the battery terminals and battery cable connectors. The battery shields protect the battery terminals and connections from corrosion and also prevent inadvertent contact with the terminals by a person working on the vehicle.

Current battery terminal shields comprise a generally planar base portion having a orifice for receiving the battery terminal. A cover generally comprises a generally planar upper wall and a peripheral wall extending downwardly from the periphery of the upper wall. The cover and base are molded together as a single piece and connected by a living hinge. A pair of latch windows extend upwardly from either side of the base portion. The peripheral wall of the cover includes a pair of latches which snap into the latch windows on the base. The peripheral wall of the cover is deformable inwardly to selectively release the latches from the latch windows to open the cover of the battery terminal shield.

Current designs of the battery terminal shields have several drawbacks. First, during manufacture, the living hinge must be opened and closed several times during or immediately after the molding of the base and cover in order to develop the living hinge. This additional step increases the manufacturing time and cost. Second, the living hinge becomes brittle in cold temperatures. This problem is exacerbated by the fact that access to battery terminals is often required during cold weather.

SUMMARY OF THE INVENTION

The present invention provides a battery terminal shield with improved durability and cold temperature performance and which is easy to assemble to disassembly.

The battery terminal shield of the present invention generally comprises a base including a lower wall having an orifice for receiving a battery terminal and a cover including an upper wall and a peripheral wall extending downwardly from the periphery of the upper wall. The base and cover each include a hinge member which interlocks with the other hinge member to form a hinge connection between the cover and the base. In a preferred embodiment, the cover includes an integral, generally cylindrical hinge pin having opposite axial ends. The base preferably includes a pair of integral hinge sockets into which the axial ends of the hinge pin are snap fit.

Preferably each of the sockets is formed by an upper arch bracket supporting an outer socket wall. Each socket further includes a locking finger at each axial end of the hinge pin. Each locking finger preferably flexes axially outwardly upon insertion of the hinge pin into the sockets. The locking finger is formed integrally with the base, and is specifically integral with the rear wall and outer socket wall. The locking finger includes a ledge projecting inwardly from the locking finger between the first end and an opposite second end of the locking finger. The ledge includes a bearing surface upon which the hinge pin is supported. The locking finger further includes an inner surface ramping inwardly from the second end to the ledge.

Preferably each of the base and the cover are molded as a single separate piece integral with their respective hinge members. The base and cover can each be molded without inserts and side cams. The cover is then connected to the base by pressing the hinge pin upwardly against the ramped surface of the locking fingers, thereby deflecting the locking fingers axially outwardly of the hinge pin. When the locking fingers deform outwardly sufficiently, the hinge pin snaps into the sockets, permitting the locking fingers to return to their original position, with the bearing surfaces of the ledges snugly retaining the hinge pin in the sockets. Because the locking fingers are supported at an end of the locking finger on an opposite side of the ledge of the ramp surface, the ledge and bearing surface are deflected downwardly and outwardly away from the socket during insertion of the hinge pin. Therefore, there is no need to provide additional clearance in the dimension of the socket for deflection of the ledge.

Although easy to assemble, the battery terminal shield of the present invention is durable and has improved cold weather performance, since no plastic parts in the hinge are deformed during opening and closing of the cover.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF A PREFERRED EMBODIMENT

Figure 1:
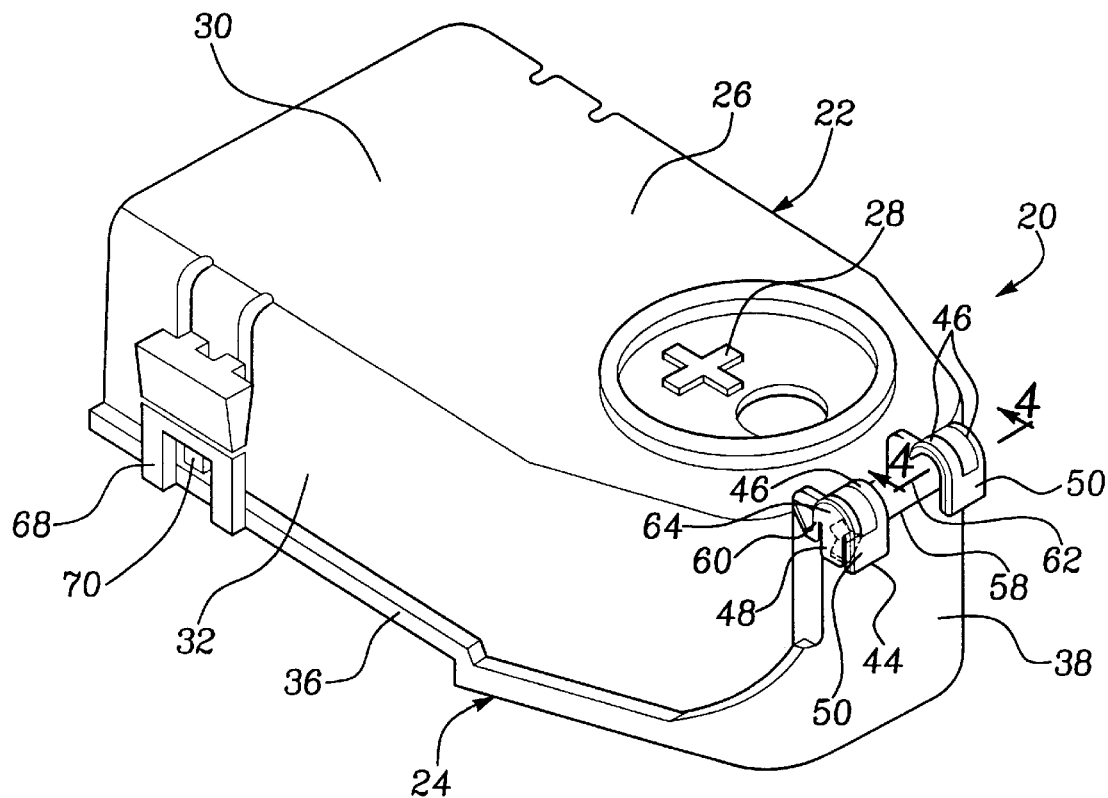
FIG. 1 is a perspective view of the battery terminal shield of the present invention.

A battery terminal shield 20 is generally shown in FIG. 1 comprising a cover 22 and a base 24. The cover 22 comprises a generally planar upper wall 26 having molded indicia 28 of polarity and instructive indicia 30 for opening the battery terminal shield 20. A peripheral wall 32 extends downwardly generally from either lateral side of the upper wall 26.

The base 24 generally comprises a generally planar lower wall 36 having a rear wall 38 extending upwardly from a rear portion of the lower wall 36. The rear wall 38 of the base 24 supports an integral first hinge member 42. The first hinge member 42 preferably comprises a pair of sockets 44. Each socket 44 comprises a pair of brackets 46 arching from an upper edge 48 of the rear wall 38 to support an outer socket wall 50 which is generally parallel to the rear wall 38. A locking finger 52 is supported at the axial end of each socket 44. The locking finger 52 is integral with the base 24, and more specifically integral with the upper edge 48 of the rear wall 38 and the outer socket wall 50. The locking finger 52 is flexible outwardly, pivoting at the connections between the locking finger 52 and the rear wall 38 and the outer socket wall 50.

The cover 22 preferably includes an integral second hinge member 58. The second hinge member 58 preferably comprises a generally cylindrical hinge pin 60 suspended by a bracket 62 and having axial ends 64.

The base 24 further includes a pair of first connectors 68, such as latch windows 68. The cover 22 further includes a pair of complementary second connectors 70, such as latches 70. The first and second connectors 68, 70 shown and other hinge members are described in co-pending application U.S. Ser. No. 08/796,469, filed on Feb. 10, 1997.

Figure 2:
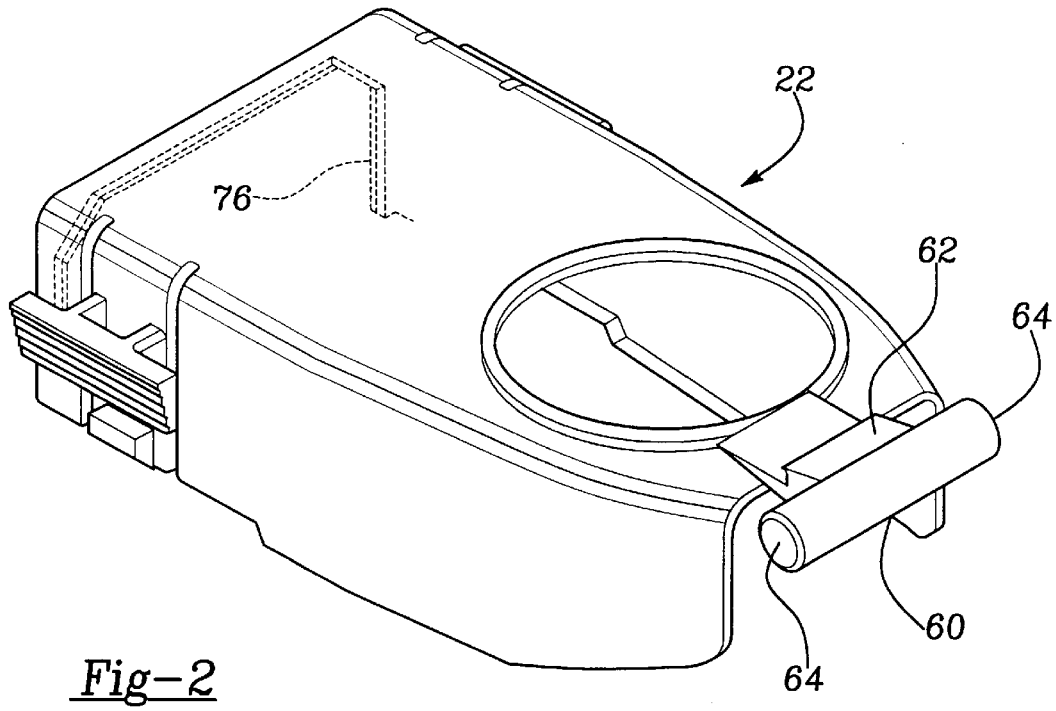
FIG. 2 is a perspective view of the cover of the battery terminal shield of FIG. 1.

The cover 22 is shown in FIG. 2. The cover 22 is a single molded piece, preferably comprising polypropylene. The hinge pin 60 is preferably generally cylindrical having axial ends 64 and supported by bracket 62. Opposite the hinge pin 60 is the front orifice 76, through which a battery cable passes.

Figure 3:
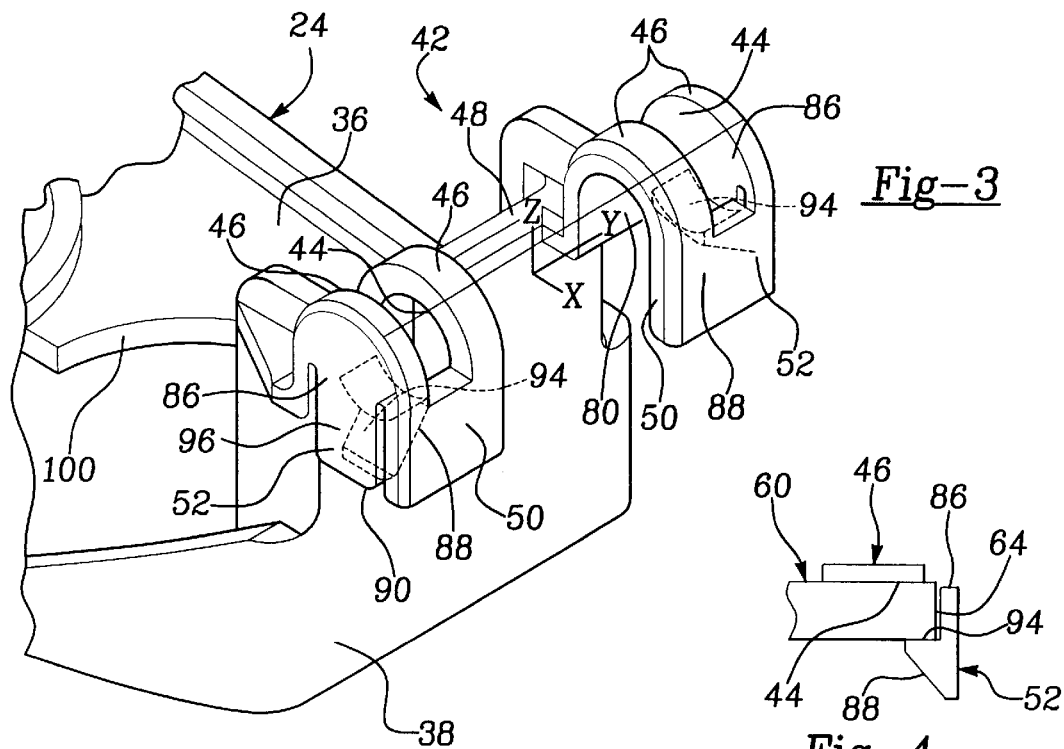
FIG. 3 is an enlarged perspective view of the hinge member of the base of the battery terminal shield of FIG. 1.

The first hinge member 42 of the base 24 is shown in detail in FIG. 3. The first hinge member 42 comprises the pair of opposing sockets 44. Each of the sockets comprises the pair of brackets 46 arching from the upper edge 48 of the rear wall 38 to support the outer socket wall 50 which is generally parallel to the rear wall 38. The socket wall 50 and rear wall 38 define a channel 80 which terminates in bracket 46. The locking finger 52 is suspended at a first end 86 which is integral with the rear wall 38 and the outer socket wall 50. Each locking finger 52 includes a ledge 88 projecting inwardly toward the opposite socket 54 between the first end 86 and an opposite lower second end 90. The ledge 88 includes a bearing surface 94 defining the socket 44. The bearing surface 94 is preferably concave having a radius generally equal to the outer radius of the hinge pin 60. Each locking finger includes a ramped surface 96 leading from the second end 90 inwardly to the ledge 88 and bearing surface 94. The base 24 further includes a terminal orifice 100 for receiving a battery terminal.

Figure 4:
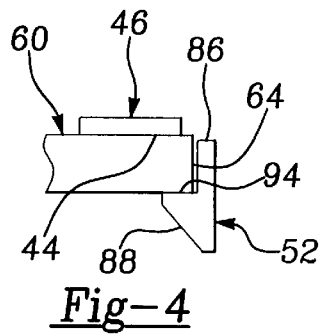
FIG. 4 is a partial sectional view taken along line 4—4 of FIG. 1.

The hinge pin 60 is shown interlocked with one of the sockets 44 in FIG. 4. The hinge pin 60 is retained at an axial end 64 by the locking finger 52 and on opposite radial sides by the bracket 46 and the bearing surface 94 of the ledge 88.

Figure 5:
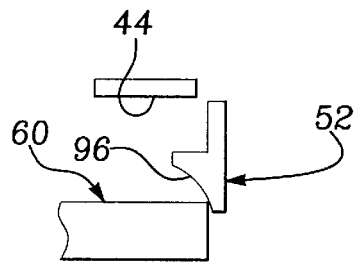
FIG. 5 is the socket and hinge pin of FIG. 4 in a first assembly step.

As can be seen in FIG. 5, during insertion of the hinge pin 60 into the socket 44, the hinge pin 60 first contacts the ramped surface 96 of the locking finger 52, thereby biasing locking finger 52 axially outwardly from the hinge pin 60.

Figure 6:
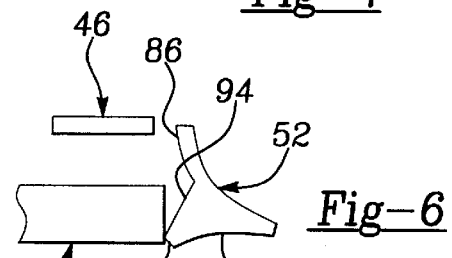
FIG. 6 is the socket and hinge pin of FIG. 4 in a second assembly step.

As can be seen in FIG. 6, as the hinge pin 60 is further inserted into the socket 44, the locking finger 52 is deflected axially outwardly from the hinge pin 60 and bearing surface 94 is deflected downwardly, thereby temporarily increasing the distance between the bracket 46 and bearing surface 94. Once hinge pin 60 clears the inner most edge 102 of the bearing surface 94, the locking finger 52 snaps back into place, snapping hinge pin 60 securely into socket 44, as shown in FIG. 4. Because the locking finger 52 is pivotally supported at end 86 opposite the ramped surface 96, the ledge 88 and bearing surface 94 pivot away from, rather than into socket 44. A snug fit between the hinge pin 60 and the socket 44 is provided, because no extra clearance is provided for deflection of the locking finger 52 into the socket 44 during insertion of the hinge pin 60 into the socket 44.

Figure 7:
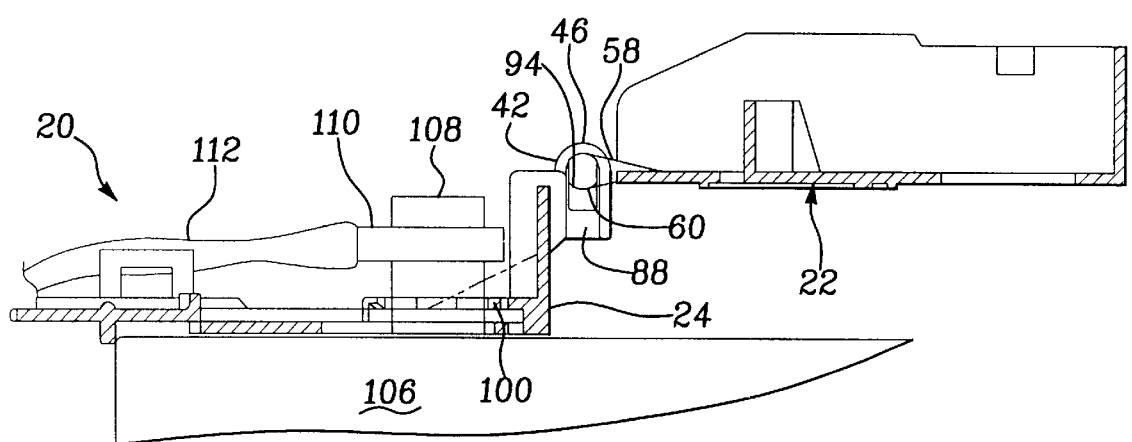
FIG. 7 is a side sectional view of the battery terminal shield of FIG. 1 installed on a battery and in an open position.

In use, the battery terminal shield 20 is installed on a battery 106 as shown in FIG. 7. The first hinge member of the base 24 is interlocked with the second hinge member 58 of the cover 22. The battery terminal shield 20 is then installed on a battery 106 by inserting a battery terminal 108 through the orifice 100 in the base 24. Subsequently, a connector 110 for a battery cable 112 is connected to the battery terminal 108. The cover 22 can then be pivoted to close the battery terminal shield 20, substantially enclosing battery terminal 108 and connector 110, leaving battery cable 112 to pass through front orifice 76 of the cover 22. Referring to FIG. 7, because the brackets 46 are on the cover 22 side of the hinge pin 60 and the bearing surface 94 is on the base 24 side of the hinge pin 60, forces tending to separate the cover 22 from the base 24 during opening of the cover 22 will bear upon the brackets 46, rather than the ledge 88 and bearing surface 94. Because no plastic components in the hinge members 42, 58 are deformed during operation of the cover 22 and base 24, the battery terminal shield 20 of the present invention has improved cold weather and durability performance.

Modifications to the preferred embodiment described above should be apparent. For example, although the benefits of orienting the brackets 46 away from the base 24 are described above, the sockets 44 could be inverted, such that the hinge pin 60 would be inserted downwardly into sockets 44. Further, it should be apparent that one of the sockets 44 could be a solid socket, i.e. without a flexible locking finger 52; for assembly, one axial end 64 of the hinge pin 60 would be inserted into the fixed socket in the opposite axial end 64 would be snapped into the type of socket described above. It should also be apparent that the hinge pin 60 could alternatively be formed integrally with the base 24 with the sockets 44 formed on the cover 22.

In accordance with the provisions of the patent statutes, the present invention has been described in what is considered to represent a preferred embodiment. However, it should be noted that the invention can be practiced otherwise than as specifically illustrated and described without departing from its spirit or scope.

What is claimed is:

1. A battery terminal shield comprising:
   a base including a lower wall having an orifice for receiving a battery terminal;
   a cover including an upper wall and a peripheral wall extending downwardly from the periphery of said upper wall;
   one of said cover and said base including a generally cylindrical hinge pin having opposite axial ends, said hinge pin molded integrally with said one of said base and said cover, the other of said base and said cover including a pair of hinge sockets, said hinge pin disposed in said hinge sockets to hingedly connect said cover to said base.

2. The battery terminal shield of claim 1 wherein said hinge pin is snap-fit into at least one of said sockets.

3. The battery terminal shield of claim 1 wherein said axial ends of said hinge pin are retained in said sockets.

4. A battery terminal shield comprising:
   a base including a lower wall having an orifice for receiving a battery terminal;
   a cover including an upper wall and a peripheral wall extending downwardly from the periphery of said upper wall;
   one of said cover and said base including a generally cylindrical hinge pin having opposite axial ends, the other including a pair of hinge sockets,
   a locking finger adjacent at least one of said sockets, said hinge pin disposed in said hinge sockets to hingedly connect said cover to said base, said locking finger flexing upon insertion of said hinge pin and retaining said hinge pin.

5. The battery terminal shield of claim 4 wherein both of said sockets include said locking fingers.

6. The battery terminal shield of claim 4 wherein said locking finger is integral at a first end with said other of said cover and said base, said locking finger including a ledge projecting inwardly toward the other socket between said first end and an opposite second end, said ledge including a bearing surface upon which said hinge pin is retained.

7. The battery terminal shield of claim 4 wherein said locking finger is adjacent an axial end of said hinge pin, said locking finger flexing axially outwardly of said hinge pin upon insertion of said hinge pin.

8. The battery terminal shield of claim 7 wherein said locking finger includes an inner surface ramping inwardly from said second end to said ledge.

9. The battery terminal shield of claim 8 wherein said bearing surface is concave, having a radius generally equal to an outer radius of said hinge pin.

10. The battery terminal shield of claim 9 further including:

a bracket integral with said other of said cover and said base, said bracket and said bearing surface defining said socket, said bracket and said ledge on generally opposite sides of said hinge pin, said ledge on a first side toward said other of said cover and said base, said bracket on a second side toward said one of said cover and said base.

11. The battery terminal shield of claim 10 wherein said locking finger is molded integrally with said other of said base and said cover.

12. A battery terminal shield comprising:

a base including a lower wall having an orifice for receiving a battery terminal;

a cover including an upper wall and a peripheral wall extending downwardly from the periphery of said upper wall;

one of said cover and said base including a generally cylindrical hinge pin having opposite axial ends, the other including a pair of hinge sockets, said hinge pin snap-fit into said hinge sockets to hingedly connect said cover to said base;

a locking finger adjacent at least one of said sockets, said locking finger flexing axially outwardly of said hinge pin upon insertion of said hinge pin, said locking finger being integral at a first end with said other of said cover and said base, said locking finger including a ledge projecting inwardly from said locking finger between said first end and an opposite second end, said ledge including a bearing surface upon which said hinge pin is retained;

a bracket and said bearing surface defining said socket, said bracket and said ledge on generally opposite sides of said hinge pin, said ledge on a first side toward said other of said cover and said base, said bracket on a second side toward said one of said cover and said base.

13. The battery terminal shield of claim 12 wherein said hinge pin is integral with said cover and said sockets are integral with said base, said base including a rear wall extending upwardly from said lower wall, said bracket integral with said rear wall and supporting a socket wall generally parallel to said rear wall, said socket defined between said bracket, said ledge, said rear wall, and said socket wall, said socket wall and said rear wall defining a channel terminating in said bracket, said hinge pin inserted upwardly into said channel toward said bracket.

* * * * *